(12) United States Patent
Goldburg et al.

(10) Patent No.: US 10,924,359 B2
(45) Date of Patent: *Feb. 16, 2021

(54) DEVICE ABSTRACTION PROXY

(71) Applicant: ASSIA SPE, LLC, Wilmington, DE (US)

(72) Inventors: Marc Goldburg, Redwood City, CA (US); Philip Bednarz, Palo Alto, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/040,958

(22) Filed: Jul. 20, 2018

(65) Prior Publication Data

US 2018/0331920 A1 Nov. 15, 2018

Related U.S. Application Data

(60) Continuation of application No. 15/188,959, filed on Jun. 21, 2016, now Pat. No. 10,050,846, which is a (Continued)

(51) Int. Cl.
*H04L 12/28* (2006.01)
*H04L 12/24* (2006.01)
*G06F 9/54* (2006.01)

(52) U.S. Cl.
CPC .............. *H04L 41/32* (2013.01); *G06F 9/541* (2013.01); *H04L 12/2856* (2013.01); *H04L 12/2894* (2013.01); *H04L 41/0806* (2013.01)

(58) Field of Classification Search
None
See application file for complete search history.

(56) References Cited

U.S. PATENT DOCUMENTS 6,023,474 A   2/2000  Gardner et al.
6,470,009 B1  10/2002 Christie et al.
(Continued)

FOREIGN PATENT DOCUMENTS

CN    101453399 A   6/2009
CN    101459447 A   6/2009
(Continued)

OTHER PUBLICATIONS

Office Action dated Aug. 13, 2018 in Canadian Patent Application No. 2779631 (3pgs).
(Continued)

*Primary Examiner* — Kenny S Lin
(74) *Attorney, Agent, or Firm* — North Weber and Baugh LLP; Michael North

(57) ABSTRACT

Described are systems and methods for implementing and operating a Device Abstraction Proxy (DAP). In one embodiment, the DAP includes a communications interface to connect the DAP to one or more access aggregation devices, each having a plurality of physical ports to provide Digital Subscriber Line (DSL) communication services to a plurality of remote DSL terminals via the plurality of physical ports. The DAP may further include a memory and processor to execute a virtual access aggregation device, in which a subset of the plurality of physical ports are allocated and linked to corresponding logical ports. The DAP may further include a global rule-set module to define operational constraints for the DSL communication services, and a management interface to allow at least one broadband access management system to manage the subset of physical ports allocated to the virtual access aggregation device subject to the operational constraints.

17 Claims, 9 Drawing Sheets

Related U.S. Application Data division of application No. 13/610,195, filed on Sep. 11, 2012, now Pat. No. 9,374,240, which is a division of application No. 13/511,632, filed as application No. PCT/US2010/055173 on Nov. 2, 2010, now Pat. No. 9,344,294.

(60) Provisional application No. 61/257,402, filed on Nov. 2, 2009.

(56) References Cited

U.S. PATENT DOCUMENTS

| | | | |
|---|---|---|---|
| 6,522,629 | B1 | 2/2003 | Anderson, Sr. |
| 6,574,308 | B1 | 6/2003 | Macdonald et al. |
| 6,807,171 | B1 | 10/2004 | Chow et al. |
| 7,492,761 | B1 | 2/2009 | Farr et al. |
| 7,787,494 | B1 | 8/2010 | Aubin et al. |
| 7,809,116 | B2 | 10/2010 | Rhee et al. |
| 8,363,658 | B1 | 1/2013 | Delker et al. |
| 8,660,003 | B2 | 2/2014 | Cooke et al. |
| 2002/0029260 | A1 | 3/2002 | Dobbins et al. |
| 2004/0037280 | A1* | 2/2004 | Hein .................. H04L 12/1854 370/390 |
| 2004/0098501 | A1 | 5/2004 | Finn |
| 2005/0185656 | A1 | 8/2005 | Svensson et al. |
| 2007/0011740 | A1 | 1/2007 | Davis et al. |
| 2007/0036339 | A1 | 2/2007 | Cioffi et al. |
| 2007/0118643 | A1 | 3/2007 | Mishra et al. |
| 2007/0242655 | A1 | 10/2007 | Li et al. |
| 2008/0089305 | A1 | 4/2008 | Yao et al. |
| 2008/0205435 | A1 | 8/2008 | Nahumi et al. |
| 2009/0074153 | A1 | 3/2009 | Wu et al. |
| 2009/0086798 | A1 | 4/2009 | Zukunft et al. |
| 2009/0161677 | A1 | 6/2009 | Zheng |
| 2009/0207985 | A1 | 8/2009 | Cioffi et al. |
| 2010/0036939 | A1 | 2/2010 | Yang et al. |
| 2010/0296648 | A1 | 11/2010 | Fang et al. |

FOREIGN PATENT DOCUMENTS

| | | |
|---|---|---|
| CN | 101461253 A | 6/2009 |
| EP | 2037632 A1 | 5/1989 |
| EP | 2237438 A1 | 6/2010 |
| JP | 2008527929 | 7/2008 |
| WO | 2002010944 A1 | 2/2002 |
| WO | 2004107671 A1 | 12/2004 |
| WO | 2008148347 A1 | 12/2008 |
| WO | 2009097765 A1 | 8/2009 |
| WO | 2011054006 A1 | 5/2011 |
| WO | 2012091725 A1 | 7/2012 |

OTHER PUBLICATIONS

Notice of Allowance for Canadian Patent Application No. 2,779,631, dated Oct. 8, 2019.
Office Action dated Dec. 17, 2018 in European Patent Application No. 17197764.8 (4pgs).
"Dynamic Line Management for Digital Subscriber Lines," Internet Citation dated Apr. 8, 2005, XP002442256, URL: http://www.1.alcatel-lucent.com/com/en/appcontent/apl/18812_DLM_.
First Office Action dated Nov. 15, 2014, for Chinese Patent Application No. 201210414387.6 (26 pgs).
International Search Report dated May 2, 2011, in International PCT Patent Application No. PCT/US2010/055173 (4pgs).
Written Opinion dated May 2, 2011, in International PCT Patent Application No. PCT/US2010/055173 (6pgs).
International Preliminary Report on Patentability dated May 8, 2012, in International PCT Patent Application No. PCT/US2010/055173 (7pgs).
Office Action dated Jul. 27, 2016, in Canadian Patent Application No. 2779631 (3pgs).
Request for Reinstatement and Response filed Jan. 29, 2018, in Canadian Patent Application No. 2779631 (32pgs).
Extended European Search Report dated Jan. 15, 2018, in European Patent Application No. 17197764.8 (11pgs).
Response to Search Report filed Oct. 4, 2018, in European Patent Application No. 17197764.8 (5pgs).

* cited by examiner

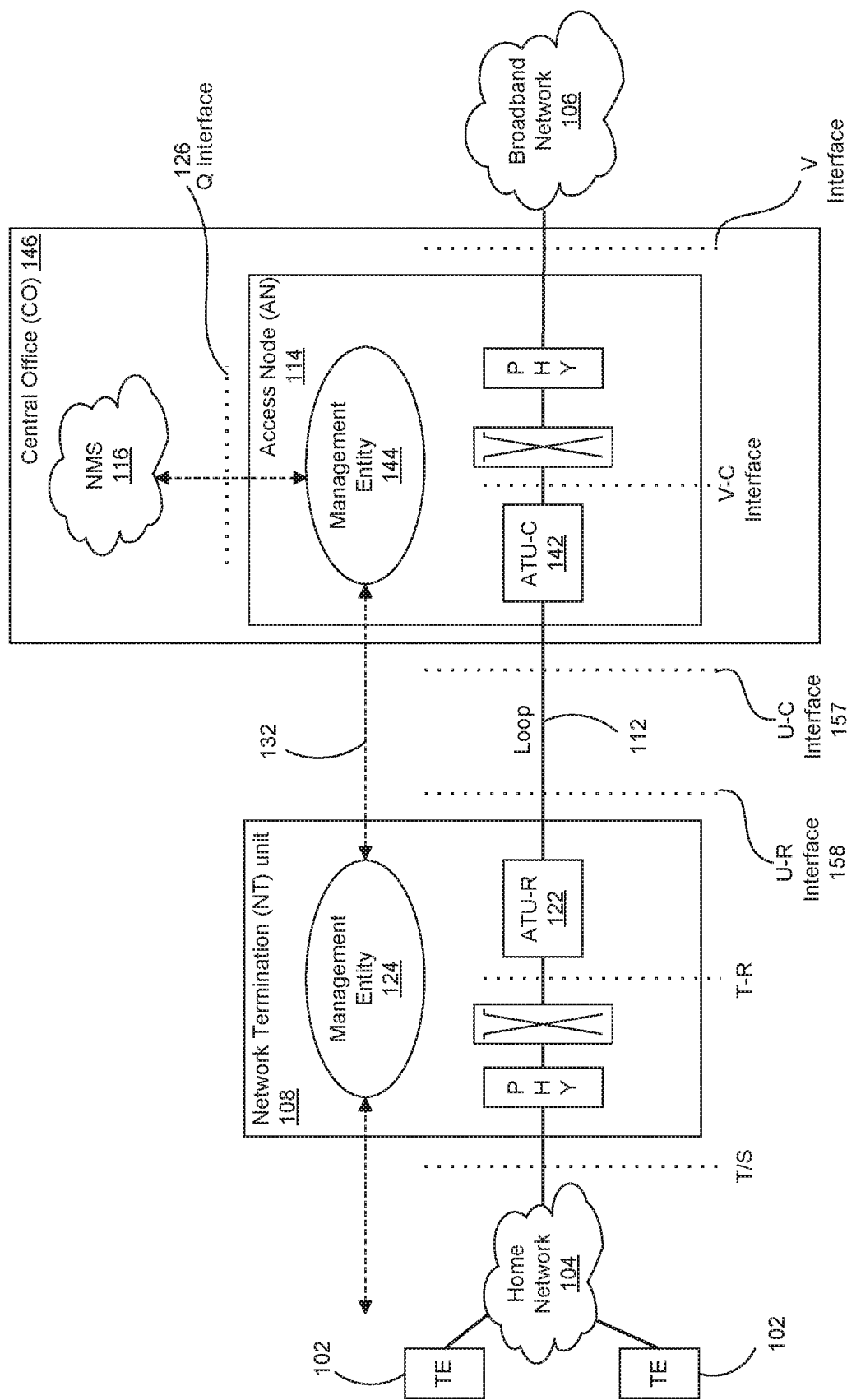

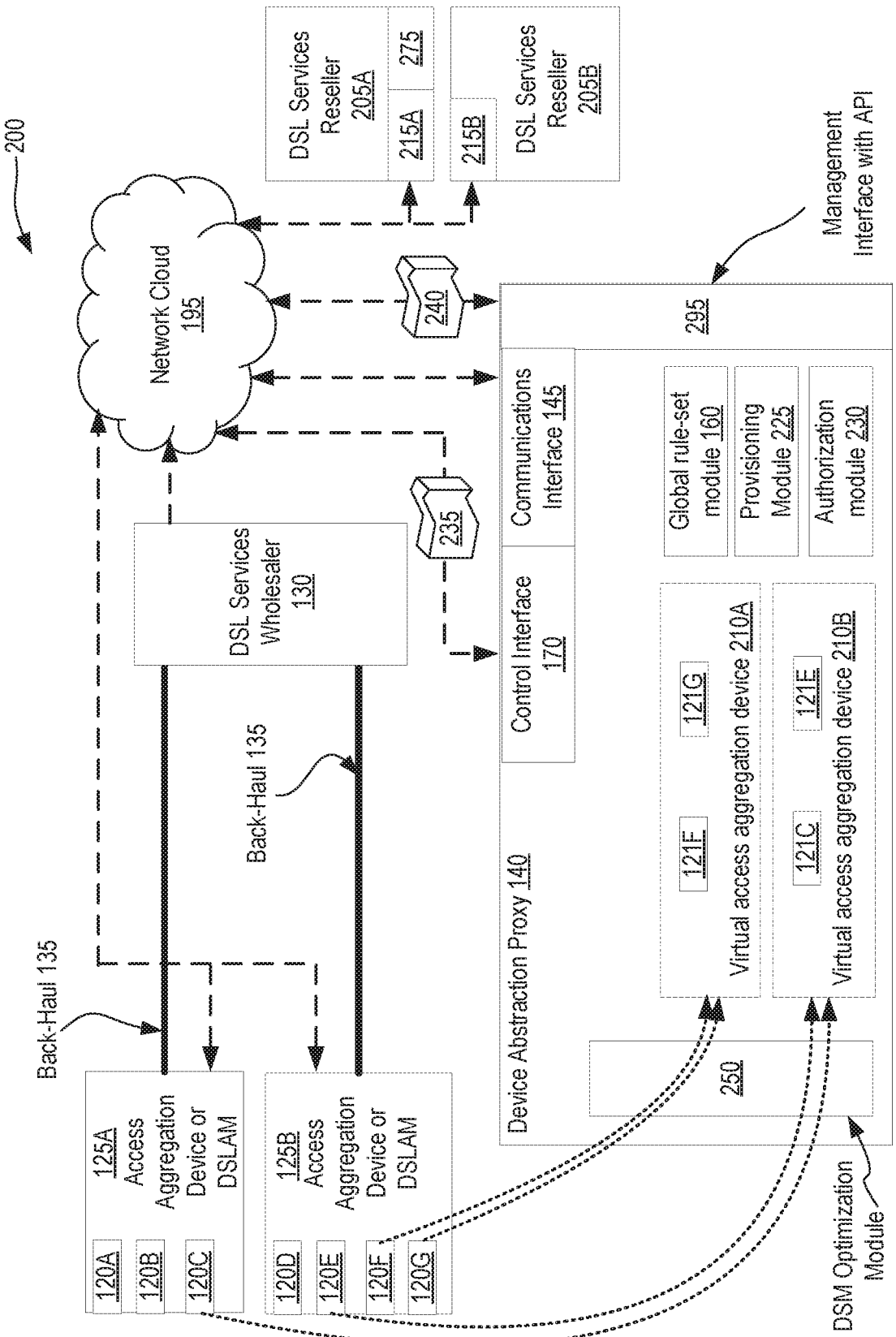

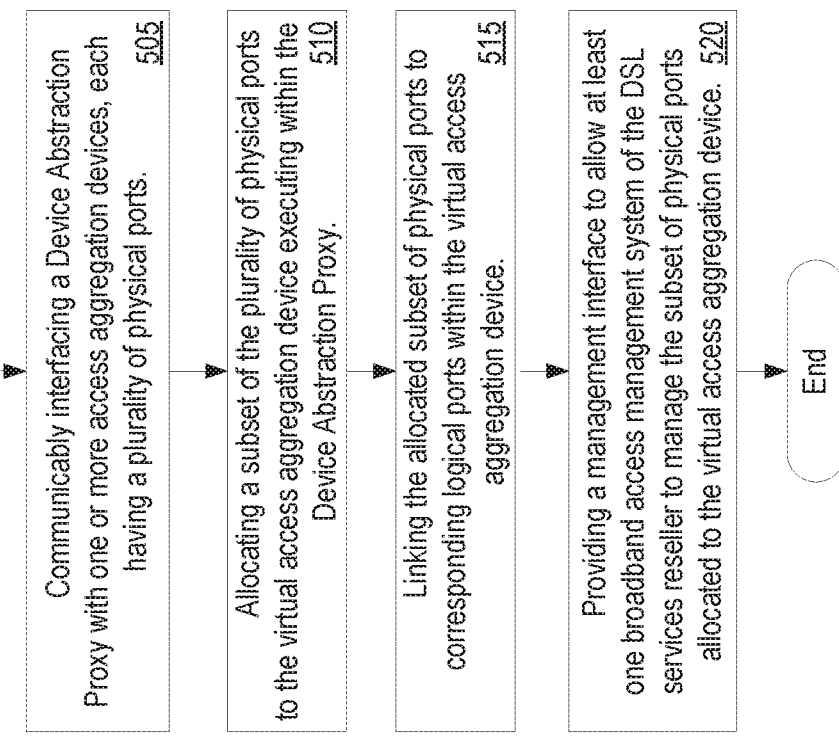

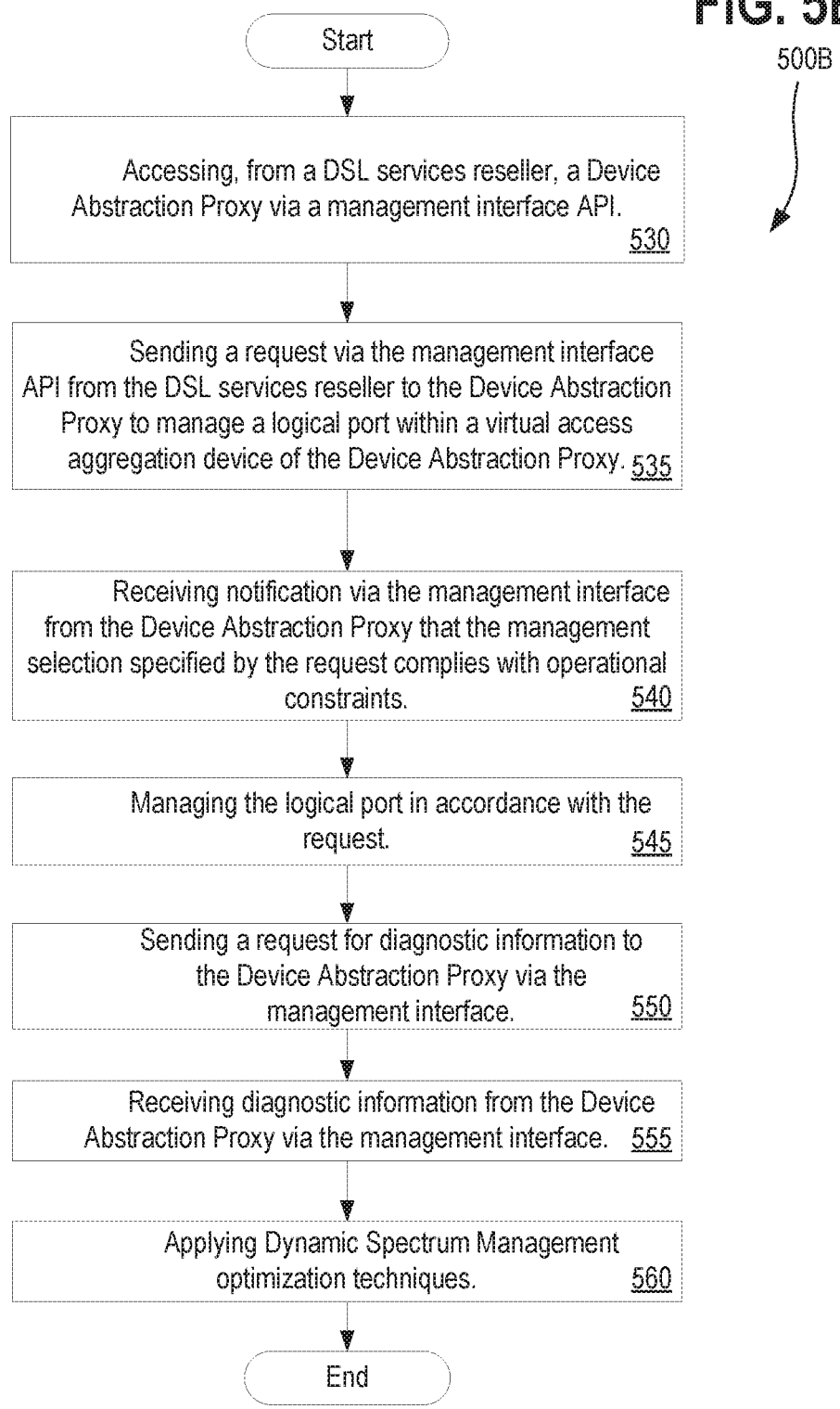

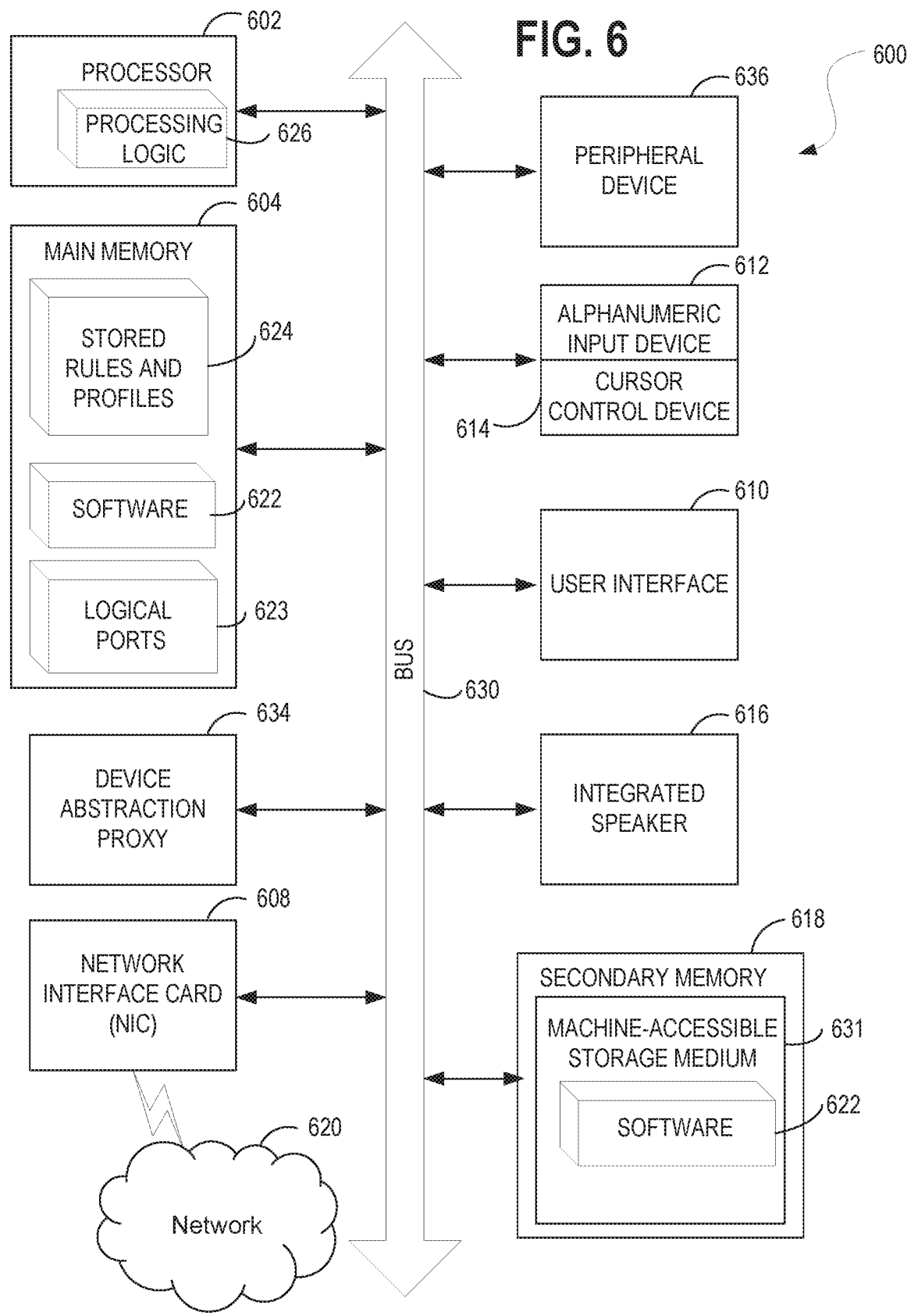

DEVICE ABSTRACTION PROXY

CROSS-REFERENCE TO RELATED APPLICATIONS

This application is a continuation of U.S. patent application Ser. No. 15/188,959, entitled "DEVICE ABSTRACTION PROXY," naming as inventors Marc Goldburg and Philip Bednarz, and filed Jun. 21, 2016, which is a divisional of U.S. patent application Ser. No. 13/610,195, entitled "DEVICE ABSTRACTION PROXY," naming as inventors Marc Goldburg and Philip Bednarz, and filed Sep. 11, 2012, which is a divisional of a U.S. National Phase patent application Ser. No. 13/511,632, entitled "DEVICE ABSTRACTION PROXY," naming as inventors Marc Goldburg and Philip Bednarz, and filed Aug. 16, 2012, which issued May 17, 2016, as U.S. Pat. No. 9,344,294, and is the U.S. National Phase of International Application No. PCT/US2010/055173, entitled "DEVICE ABSTRACTION PROXY," naming as inventors Marc Goldburg and Philip Bednarz, and filed Nov. 2, 2010, which claims priority to U.S. Provisional Patent Application No. 61/257,402, entitled "DEVICE ABSTRACTION PROXY," entitled "DEVICE ABSTRACTION PROXY," naming as inventors Marc Goldburg and Philip Bednarz, and filed Nov. 2, 2009, which applications are hereby incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to Device Abstraction Proxy (DAP) systems and methods for implementing and operating Device Abstraction Proxies.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Many end-user consumers including residential consumers and business consumers connect to the Internet by way of Digital Subscriber Line (DSL) technologies. With DSL technologies, a service provider provides its end-users with Internet bandwidth, at least a portion of which is carried over copper twisted pair telephone lines. The use of twisted pair telephone lines to deliver Internet bandwidth to an end-user is beneficial because such lines are commonly pre-existing in a potential end-user's location, and thus, activating service does not required expensive retrofitting of a potential end-user's location with a communication medium to connect the end-user's location to a service provider.

The present state of the art may benefit from the Device Abstraction Proxy systems and methods which are described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 1A illustrates an exemplary architecture in which embodiments may operate;

FIG. 2 illustrates an alternative exemplary architecture in which embodiments may operate;

FIGS. 5A, 5B, and 5C are flow diagrams illustrating methods for implementing and operating Device Abstraction Proxies accordance with described embodiments; and FIG. 6 illustrates a diagrammatic representation of a machine in the exemplary form of a computer system, in accordance with one embodiment.

DETAILED DESCRIPTION OF THE EMBODIMENTS

Figure 1B:
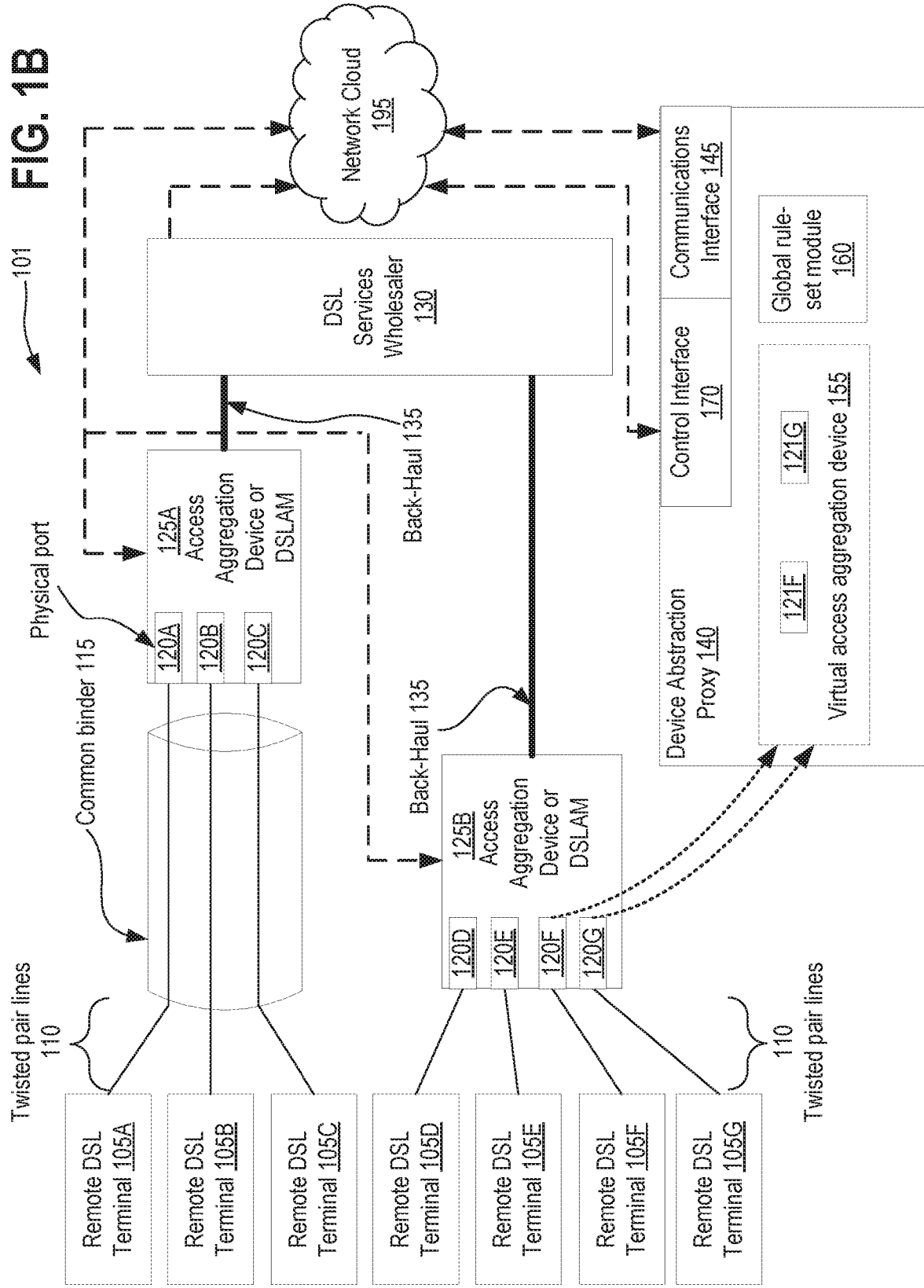
FIG. 1B illustrates an alternative exemplary architecture in which embodiments may operate.

Described herein are Device Abstraction Proxy (DAP) systems and methods for implementing and operating Device Abstraction Proxies. In one embodiment, such a Device Abstraction Proxy includes a communications interface to connect the Device Abstraction Proxy to one or more access aggregation devices, each having a plurality of physical ports to provide Digital Subscriber Line (DSL) communication services to a plurality of remote DSL terminals via the plurality of physical ports. In such an embodiment, the Device Abstraction Proxy further includes a memory and processor to generate, create, instantiate and/or execute a virtual access aggregation device, in which a subset of the plurality of physical ports are allocated to the virtual access aggregation device and linked to corresponding logical ports within the virtual access aggregation device. Such a Device Abstraction Proxy further includes a global rule-set module to define operational constraints for the DSL communication services, and a management interface to allow at least one broadband access management system to manage the subset of physical ports allocated to the virtual access aggregation device subject to the operational constraints.

In some locations, a DSL services wholesaler provides DSL communication equipment to form an infrastructure for such services and DSL services resellers sell DSL services (e.g., "Internet access") delivered over that infrastructure to individual consumers or end-users. Because the DSL services wholesaler controls the equipment forming the DSL infrastructure and the DSL services reseller maintains a services relationship with the consumers, conflicts exist between a DSL services wholesaler's interest in protecting the integrity of the infrastructure and a DSL services reseller's desire to access and control the equipment in the interest of ensuring optimum service quality to the end-users that the reseller is responsible for.

These conflicts are exacerbated when multiple DSL services resellers operate and compete for end-users in the same geographical area, and in turn, must co-exist on the DSL services wholesaler's common infrastructure equipment because each of the competing DSL services resellers have an interest in optimizing the quality of service provided to their own end-user consumers, even if doing so may be to the detriment of end-user consumers associated with a competing DSL services reseller. Practicing the systems and methods described herein may permit and promote competition among DSL services resellers, including DSL services wholesalers who also act as DSL services resellers, without degrading the underlying infrastructure upon which DSL communication services are offered to consumers.

Broadband communications services providers are increasingly utilizing network architectures in which the so-called "last-mile" connection is a copper, fiber or cable connection with one endpoint at a services subscriber's premises and another endpoint at an access aggregation device located in a street cabinet or vault in the general vicinity of the subscriber's premises. The access aggregation device may be, for example, a DSL Access Multiplexer (DSLAM), a cable head-end, or a fiber optic splitter. The access aggregation device is in turn connected to a broadband core network via a second broadband link, for example a fiber optic link.

Some broadband DSL services providers operate their own access aggregation devices such as DSLAMs connected to the copper loop that extends to a subscriber's premises. However, other broadband DSL services providers do not own the copper loop, such as when the broadband DSL services provider is a Competitive Local Exchange Carrier (CLEC) in the United States. Such broadband DSL services providers may instead pay a rental fee to the owner of the copper loops that extend to each of the broadband DSL services provider's customers. For several reasons, including space constraints in street cabinets and vaults, it may be impractical for the access aggregation devices of multiple broadband providers to be installed in the street cabinets and vaults that are increasingly becoming the standard location for access aggregation devices.

Accordingly, a business model for the delivery of broadband services is now evolving in which a "wholesaler" deploys and operates the equipment, such as access aggregation devices in the street cabinets and vaults, and then resells "ports" to "resellers," who deliver broadband services to subscribers via physical ports on the wholesaler's access aggregation devices. With this model, multiple broadband DSL services providers can compete for subscribers over a common infrastructure owned and operated by a single wholesaler responsible for the underlying equipment that makes up the broadband communication infrastructure.

Using the systems and methodologies described herein, administrative authority for controlling certain events and controlling a portion of the functionality of an access aggregation device may be retained by, for example, a DSL services wholesaler having responsibility for the equipment constituting the DSL communication infrastructure, while administrative authority for controlling other events and controlling other functions of an access aggregation device may be delegated to a DSL services reseller that is responsible for a portion of the end-user consumers that are provided Internet bandwidth over the DSL services wholesaler's equipment. Moreover, the physical ports at multiple access aggregation devices can be abstracted and then represented to a DSL services reseller as one virtual access aggregation device within a Device Abstraction Proxy, thus providing a more convenient and intuitive representation for the DSL services reseller.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Device Abstraction Proxy to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data (which includes performance data) that is available at an Access Node (AN).

In FIG. 1A, users terminal equipment 102 (e.g., a Customer Premises Equipment (CPE) device or a remote terminal device) is coupled to a home network 104, which in turn is coupled to a Network Termination (NT) Unit 108. ADSL Transceiver Units (ATU) are further depicted (e.g., a device that provides ADSL modulation of a DSL loop or line). In one embodiment, NT unit 108 includes an ATU-R (ATU Remote), 122 (for example, a transceiver defined by one of the ADSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements.

Each ATU-R 122 in a system may be coupled with an ATU-C (ATU Central) in a Central Office (CO) or other central location. ATU-C 142 is located at an Access Node (AN) 114 in Central Office 146. An Management Entity 144 likewise maintains an MIB of operational data pertaining to ATU-C 142. The Access Node 114 may be coupled to a broadband network 106 or other network, as will be appreciated by those skilled in the art. ATU-R 122 and ATU-C 142 are coupled together by a loop 112, which in the case of ADSL may be a twisted pair line, such as a telephone line, which may carry other communication services besides DSL based communications.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from ATU C 142, while far-end parameters from ATU R 122 may be derived by either of two interfaces over the UA interface. Indicator bits and EOC messages may be sent using embedded channel 132 and provided at the Physical Medium Dependent (PMD) layer, and may be used to generate the required ATU-R 122 parameters in ME 144. Alternately, the operations, Administration and Maintenance (OAM) channel and a suitable protocol may be used to retrieve the parameters from ATU R 122 when requested by Management Entity 144. Similarly, the far-end parameters from ATU C 142 may be derived by either of two interfaces over the U-interface. Indicator bits and EOC message provided at the PMD layer may be used to generate the required ATU-C 142 parameters in Management Entity 124 of NT unit 108. Alternately, the OAM channel and a suitable protocol can be used to retrieve the parameters from ATU C 142 when requested by Management Entity 124.

At the U interface (also referred to as loop 112), there are two management interfaces, one at ATU C 142 (the U-C interface 157) and one at ATU R 122 (the U-R interface 158). Interface 157 provides ATU C near-end parameters for ATU R 122 to retrieve over the U interface/loop 112. Similarly, U-R interface 158 provides ATU R near-end parameters for ATU C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, ATU C and ATU R pairs may use it for transporting physical layer OAM messages. Thus, the ATU transceivers 122 and 142 of such a system share various operational data maintained in their respective MIBs.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.). A DSL services wholesaler and a DSL services reseller are described in more detail with respect to the figures that follow.

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/ Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.ads12) for ADSL2 modems, I.T.U. standard G.992.5 (a.k.a. G.ads12plus) for ADSL2+ modems, I.T.U. standard G.993.1 (a.k.a. G.vds1) for VDSL modems, I.T.U. standard G.993.2 for VDSL2 modems, I.T.U. standard G.994.1 (G.hs) for modems implementing handshake, and/ or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 1B illustrates an alternative exemplary architecture 101 in which embodiments may operate. Architecture 101 depicts multiple remote DSL terminals 105A, 105B, 105C, 105D, 105E, 105F, and 105G, each of which may correspond to an end-user location such as a customer's residence or business. In one embodiment, the remote DSL terminals 105A-G are DSL modems located within a customer's home or business, through which the customer's networked computing devices may access Internet bandwidth.

Each remote DSL terminal 105A-G is connected to an access aggregation device 125A or 125B via one or more twisted pair lines 110 (e.g., POTS telephone lines, pre-existing telephone lines connecting the customer's physical service location to the access aggregation device 125A-B, DSL loops, DSL lines, etc.). Multiple twisted pair lines 110 associated with different customer's remote DSL terminals may travel through or be co-located within a common binder 115, through which multiple twisted pair lines 110 traverse in close proximity to one another. FIG. 1 depicts the twisted pair lines 110 connecting remote DSL terminals 105A, 105B, and 105C as all traversing the common binder 115.

Each access aggregation device 125A and 125B has multiple physical ports 120A-G to which the twisted pair lines 110 from remote DSL terminals 105A-G are connected. For example, as depicted, remote DSL terminal 105A connects with physical port 120A of access aggregation device 125A, remote DSL terminal 105B connects with physical port 120B, remote DSL terminal 105C connects with physical port 120C. With respect to access aggregation device 125B, remote DSL terminal 105D connects with physical port 120D, remote DSL terminal 105E connects with physical port 120E, remote DSL terminal 105F connects with physical port 120F, and remote DSL terminal 105G connects with physical port 120G.

In one embodiment, each of the plurality of access aggregation devices 125A-B are Digital Subscriber Line Access Multipliers (DSLAMs), each having a respective plurality of physical ports (e.g., physical ports 120A-C correspond to DSLAM 125A and physical ports 120D-G correspond to DSLAM 125B). In such an embodiment, each DSLAM 125A-B further includes a back-haul 135 communications interface to communicatively link each respective DSLAM 125A-B to a wholesaler service provider 130. The wholesaler service provider 130 may be co-located with one or more of the connected access aggregation devices 125A-B, remotely located from each of the respective access aggregation devices 125A-B, or co-located with some of the connected access aggregation devices 125A-B, and remotely located from other connected access aggregation devices 125A-B. In one embodiment, one or more access aggregation devices 125A-B are co-located at a physical central office (CO) location which also contains other equipment operated by the wholesaler 130. Each access aggregation device 125A-B connected to the DSL services wholesaler 130 via the broadband link or a back-haul 135 is provided with Internet connectivity from the DSL services wholesaler 130 which is then in turn distributed to the various remote DSL terminals 105A-G.

In one embodiment, a Device Abstraction Proxy 140 includes a communications interface 145 to connect the Device Abstraction Proxy to a plurality of remotely located access aggregation devices (e.g., 125A and 125B) and other various network elements making up a DSL wholesaler's infrastructure equipment. In one embodiment, the communications interface 145 connects with and communicates with the access aggregation devices (e.g., 125A and 125B) and other network elements via network cloud 195. For example, network cloud 195 may be Internet connectivity or Internet access over, for example, a publicly accessible network. Such communications may transmitted in a secure manner, or communicated within a Virtual Private Network (VPN) over a publicly accessible network. In one embodiment, each access aggregation device 125A-B has a plurality of physical ports 120A-G to provide Digital Subscriber Line (DSL) communication services to a plurality of remote DSL terminals 105A-C via the plurality of physical ports. The DSL communication services may be administered and configured via the communications interface 145 over network cloud 195.

In one embodiment, the Device Abstraction Proxy 140 includes a memory and processor to execute a virtual access aggregation device 155 within the Device Abstraction Proxy 140. In such an embodiment, a subset of the plurality of physical ports 120A-G are allocated to the virtual access aggregation device 155 and linked to corresponding logical ports 121F and 121G within the virtual access aggregation device 155. For example, FIG. 1 depicts physical ports 120F and 120G as having been allocated and linked to corresponding logical ports 121F and 121G within the virtual access aggregation device executing within the Device Abstraction Proxy 140, as indicated by the curved broken lines from access aggregation device 125B to the virtual access aggregation device 155. Other variants are also feasible. For example, in one embodiment, all physical ports of a single physical access aggregation device 125 are allocated to a single virtual access aggregation device 210 and linked accordingly to logical ports, thus presenting a single physical access aggregation device 125 in a virtualized or abstracted manner via the virtual access aggregation device due to the 1:1 correspondence between physical and logical ports. Using such an approach, a DSL services reseller may have administrative authority over multiple virtual access aggregation devices, each having a 1:1 correspondence to a physical access aggregation device. Such a presentation may be employed to present each virtual access aggregation device so that it "appears" as though it is a "real" or physical DSLAM, including the number of ports available via the virtualized access aggregation device. Multiple such virtual access aggregation devices may correspond to multiple distinct DSL services resellers, each having responsibility for a subset of the total number of virtual access aggregation devices within the Device Abstraction Proxy 140. Alternatively, all ports from multiple access aggregation devices may also be allocated to a single virtual access aggregation device. For example, a DSL services reseller may have complete or exclusive control of multiple access aggregation devices and assign them to a single virtual access aggregation device. Many such permutations are permitted in accordance with the systems and methods described.

In one embodiment, the Device Abstraction Proxy 140 further includes a global rule-set module 160 to define operational constraints for the DSL communication services. For example, DSL communication services (e.g., access to Internet bandwidth) provided to the various end-user consumers via remote DSL terminals 105A-G may be restricted in such a way that they must conform with operational constraints which are defined by the global rule-set module 160.

In a particular embodiment, a DSL services wholesaler 130 has administrative authority over the Device Abstraction Proxy 140 and controls the Device Abstraction Proxy 140 via a control interface 170. In one embodiment, control interface 170 connects with and communicates with DSL services wholesaler 130 over network cloud 195. In such a way, the DSL services wholesaler 130 may control, configure, administer, and otherwise interact with the Device Abstraction Proxy in accordance with the systems and methods described herein. In some embodiments, the DSL services wholesaler 130 may be co-located with the Device Abstraction Proxy 140 and communicate with the Device Abstraction Proxy 140 via control interface 170 over network cloud 195 (e.g., via the Internet or via a Local Area Network (LAN) or other such communication network). In other embodiments, the DSL services wholesaler 130 is remotely located (e.g., in a distinct physical local, such as a different data center) from the Device Abstraction Proxy 140 and communicates with the Device Abstraction Proxy 140 via control interface 170 over network cloud 195, for example, via the Internet or via a Wide Area Network (WAN), etc.

In a particular embodiment, a DSL services wholesaler 130 has administrative authority over the Device Abstraction Proxy 140 and controls the operational constraints defined by the global rule-set module 160 via control interface 170. In one embodiment, the operational constraints defined by the global rule-set module 160 for the DSL communication services provided to end-user consumers include one or more operational constraints selected from a group of operational constraints including: allowed spectrum masks; total power limits; one or more allowed ranges of transmit power; allowed minimum transmit power levels; allowed Dynamic Spectrum Management (DSM) policy (e.g., whether DSM must be activated or is optionally activated and whether DSM is utilized across physical ports associated with consumers of only one DSL services reseller or utilized across physical ports associated with consumers from multiple DSL services resellers), an allowed number of distinct profiles provisioned on a per virtual access aggregation device basis (e.g., how many discrete service levels are permissible for any given DSL services reseller having administrative authority over a particular virtual access aggregation device), in which each profile defines operational characteristics for a respective logical port including at least transmit power, data rate, and error protection; maximum allowed upstream aggregate bandwidth utilization on a per virtual access aggregation device basis; and maximum allowed downstream aggregate bandwidth utilization on a per virtual access aggregation device basis.

FIG. 2 illustrates an alternative exemplary architecture 200 in which embodiments may operate.

In one embodiment, the Device Abstraction Proxy 140 includes a management interface 295 to allow at least one broadband access management system to manage the subset of physical ports (e.g., physical ports 120F and 120G) allocated to a virtual access aggregation device (e.g., 210A or 210B) subject to the operational constraints imposed by a global rule-set module 160. In one embodiment, management interface 295 connects with and communicates with the DSL services resellers 205A-B via network cloud 195, for example, via the Internet.

In one embodiment, the management interface 295 of the Device Abstraction Proxy 140 provides access capabilities to one or more broadband access management systems 215A or 215B of remotely located DSL services resellers 205A or 205B. In one embodiment, the broadband access management system 215A or 215B is a remotely located client device operated by a DSL services reseller 205A or 205B. In such an embodiment, the DSL services reseller 205A or 205B has administrative authority to manage a virtual access aggregation device (e.g., 210A or 210B respectively) within the Device Abstraction Proxy 140. For example, FIG. 2 depicts an embodiment in which physical ports 120F and 120G are allocated to virtual access aggregation device 210A and correspond to logical ports 121F and 121G of virtual access aggregation device 210A. FIG. 2 further depicts physical ports 120C and 120E as being allocated to virtual access aggregation device 210B and thus linked to corresponding logical ports 121C and 121E of virtual access aggregation device 210B. In such an embodiment, DSL services reseller 205A may be delegated administrative authority over virtual access aggregation device 210A, and thus, DSL services reseller 205A manages the subset of physical ports (120F and 120G) associated with virtual access aggregation device 210A via its administrative authority to manage the corresponding logical ports (121F and 121G) within the virtual access aggregation device 210A. DSL services reseller 205B may similarly be delegated administrative authority over virtual access aggregation device 210B so that it may manage its respective physical and logical ports in a similar manner.

In one embodiment, the Device Abstraction Proxy 140 further includes a memory and processor to execute the second virtual access aggregation device 210B. In one embodiment, a second subset of the plurality of physical ports (e.g., 120C and 120E), non-overlapping with a first subset of the plurality of physical ports (e.g., 120F and 120G), are allocated to the second virtual access aggregation device 210B and linked to corresponding logical ports 121C and 121E within the second virtual access aggregation device 210B via a provisioning module 225 of the Device Abstraction Proxy 140.

In one embodiment, administrative control of each respective access aggregation device 125A and 125B is allocated to a DSL services wholesaler 130 having management responsibility for the respective access aggregation devices 125A and 125B and further having management responsibility for a corresponding back-haul 135 communications link providing each respective access aggregation device 125A and 125B with access to Internet bandwidth.

In such an embodiment, administrative control of a first virtual access aggregation device (e.g., 210A) is allocated to a first DSL services reseller 205A having access to a first portion of the Internet bandwidth accessible via the plurality of access aggregation devices 125A and 125B for re-sale to end-user consumers and administrative control of a second virtual access aggregation device (e.g., 210B) is allocated to a second DSL services reseller 205B having access to a second portion of the Internet bandwidth accessible via the plurality of access aggregation devices 125A and 125B for re-sale to end-user consumers. In such an embodiment, the first DSL services reseller 205A and the second DSL services reseller 205B may be separate and distinct business entities. For example, each may be a business competitor of the other, and each may compete for its share of available end-user consumers on the basis of price, service, reliability, speed, etc. Although each DSL services reseller 205A and 205B may utilize the same underlying communication infrastructure equipment provided by the DSL services wholesaler 130, each may seek to differentiate themselves in the marketplace by effecting varying configuration schemes within their respective virtual access aggregation device 210A-B for which they have administrative authority. Such configurations may however be subject to operational constraints implemented by the DSL services wholesaler 130 as defined by the global rule-set module 160.

In one embodiment, the Device Abstraction Proxy 140 further includes a control interface 170 to allow a DSL services wholesaler 130 having administrative authority over the Device Abstraction Proxy 140 to manage an operational configuration of the Device Abstraction Proxy 140. For example, the control interface 170 may allow the Device Abstraction Proxy 140 to receive control messages and/or instructions 235 relating to the configuration of the Device Abstraction Proxy 140. Such control messages and/or instructions 235 may instruct the Device Abstraction Proxy to generate or instantiate a new virtual access aggregation device for execution within the Device Abstraction Proxy 140 to support, for example, a new DSL services reseller. Such control messages and/or instructions 235 may instruct the Device Abstraction Proxy 140 to allocate any of physical ports 120A-G to an executing virtual access aggregation device 210 or de-allocate any of physical ports 120A-G from an executing virtual access aggregation device 210. The control messages and/or instructions 235 may instruct the global rule-set module 160 to alter or re-define the operational constraints placed upon DSL communication services rendered via the plurality of access aggregation devices 125A-B connected with the Device Abstraction Proxy 140.

In one embodiment, the Device Abstraction Proxy 140 further includes a provisioning module 225 to allocate the subset of physical ports (e.g., subset 120F and 120G) to the virtual access aggregation device 210A and to further link the subset of physical ports (e.g., subset 120F and 120G) to the corresponding logical ports (e.g., 121F and 121G) within the virtual access aggregation device (e.g., 210A) responsive to control messages and/or instructions 235 from the DSL services wholesaler 130 received at the control interface 170.

In one embodiment, the Device Abstraction Proxy 140 further includes an authorization module 230 to enforce the operational configuration of the Device Abstraction Proxy 140. Enforcing the operational configuration may include one or more operations selected from the group of: enforcing management traffic rules; enforcing service definition rules; enforcing limits on data viewable by any DSL services reseller 205A-B on a per virtual access aggregation device 210A-B basis; enforcing limits on logical port operations available to any DSL services reseller 205A-B on a per virtual access aggregation device 210A-B basis; enforcing limits on available configuration options for the DSL communication services available to any DSL services reseller 205A-B; and enforcing limits on access to diagnostic information by any DSL services reseller 205A-B on a per virtual access aggregation device 210A-B basis, responsive to control messages and/or instructions 235 from the DSL services wholesaler 130 received at the control interface 170.

In one embodiment, the management interface 295 receives a request 240 for operational data relating to DSL communication services provided to one or more of the remote DSL terminals 105A-G. In such an embodiment, the authorization module 230 of the Device Abstraction Proxy 140 may limit access to the operational data relating to the DSL communication services based on whether the one or more remote DSL terminals 105A-G are associated with logical ports (e.g., 121C, 121E, 121F, or 121G) allocated to a virtual access aggregation device 210A or 210B for which a requestor has administrative authority. For example, in accordance with the embodiment set forth by FIG. 2, if DSL services reseller 205A having administrative control over virtual access aggregation device 210A were to request information or operational data relating to physical ports 121C or 121E which are allocated to a different virtual access aggregation device, such a request would be blocked, denied, restricted, etc.

The authorization module 230 of the Device Abstraction Proxy 140 makes it possible for DSL services resellers 205 to access diagnostic information over the management interface for equipment that is owned by a DSL services wholesaler 130. Such capabilities where not previously feasible because DSL services wholesalers are naturally reluctant to grant such access rights to another party. Problems arise due to such a lack of access in which a DSL services reseller 205 who is responsible for diagnosing faults within a customer's home lacks the necessary information with which to perform the diagnosis of problems. Commonly, a DSL services reseller 205 mistakenly concludes that a fault is within the DSL communication infrastructure, and thus, the responsibility of the DSL services wholesaler 130. This creates unnecessary cost and delay, and inevitably, the DSL services wholesaler 130, who traditionally has access to more extensive diagnostic information, properly diagnoses the fault to be within a customer's home, a diagnosis that a DSL services reseller 205 may have correctly made had the DSL services reseller had access to the appropriate diagnostic information from the DSL services wholesaler's equipment.

Because the authorization module 230 is able to limit the view to only that information associated with physical ports, logical ports, and DSL loops/lines associated with a particular DSL services reseller 205 (e.g., via a virtual access aggregation device 210) the DSL services wholesaler 130 can grant access or delegate authority to retrieve pertinent diagnostic information without concern of a particular DSL services reseller 205 having unfettered access or too great of access or control to the DSL services wholesaler's equipment.

An additional benefit of delegating some control to the virtual access aggregation devices, yet subjecting such control to the operational constraints enforced by the authorization module 230, is that DSL services resellers 205 can differentiate themselves on more than simply price. For example, a particular DSL services provider may be able to offer distinct configurations in accordance with the operational constraints set by a DSL services wholesaler 130 that allow, for example, higher data rates, higher data reliability, lower latency, lower access speeds for lower costs, and so forth. This is distinguished from a traditional model in which a DSL services wholesaler 130 may specify only two or three permitted configurations, which are identical to all DSL services resellers 205 renting/leasing/buying bandwidth access from the DSL services wholesaler 130. In such a way, an improved competitive market place may be enabled.

The authorization module 230 in conjunction with delegating certain administrative control to a virtual access aggregation device 210 enables the DSL services resellers 205 to 1) properly monitor their services so that they may ensure the service provided is in accordance with the level of service promised, 2) diagnose faults more accurately and more quickly leading to reduced waste, reduced operational costs, and improved customer satisfaction, 3) differentiate services and service quality from other competitors, and 4) initiate provisioning of services to new customers through the resellers' management interface 295 which in turn relays such requests 240 to the provisioning module 225 under the control of a DSL services wholesaler 130.

In accordance with one embodiment, the Device Abstraction Proxy 140 further includes a Dynamic Spectrum Management (DSM) module 250 to apply cooperative DSM optimization techniques against at least one logical port (e.g., 121F or 121G) of the first virtual access aggregation device 210A associated with the first reseller service provider 205A and against at least one logical port (e.g., 121C or 121E) of the second virtual access aggregation device 210B associated with the second reseller service provider 205B. In some embodiments, DSM module 250 applies cooperative DSM optimization techniques against only those lines belonging to a single virtual access aggregation device (e.g., 210A), such as logical ports 121F and 121G. In such an embodiment, both logical ports are associated with physical ports (e.g., 120F and 120G) corresponding to a single access aggregation device 125G. Alternatively, DSM module 250 may apply cooperative DSM optimization techniques against only those lines belonging to a single virtual access aggregation device (e.g., 210A) where the logical ports within a single virtual access aggregation device (e.g., logical ports 121C and 121E within virtual access aggregation device 210B) correspond to physical ports on multiple access aggregation devices (e.g., physical ports 120C and 120E on access aggregation devices 125A and 125B respectively).

Administrative authority to control the DSM module 250 may be allocated to a DSL services wholesaler 130 or allocated to one or more DSL services resellers 205A-B, or allocated to both the DSL services wholesaler 130 and contemporaneously to one or more DSL services resellers 205A-B. In an embodiment where administrative authority is allocated to both the DSL services wholesaler 130 and to one or more DSL services resellers 205A-B, instructions, commands, and configurations of the DSL services wholesaler 130 may take precedence over conflicting instructions, commands, and configurations issued by any DSL services reseller 205A-B. For example, an authorization module may enforce such precedence.

The DSM module 250 provides DSL communication service optimization across multiple lines by adjusting various operational parameters applied to such lines. Such optimizations may, for example, reduce cross-talk among lines traversing a common binder by reducing transmit power or assigning communication spectrums to the lines that are less likely to create interference noise, which degrades service quality. These techniques may be considered to be applied to the twisted pair lines 110, against the physical ports 120A-G corresponding to a particular line, or against the logical ports (e.g., 121C, 121E, 121F, or 121G) associated with particular lines, but in any event, the DSM optimizations affect the underlying DSL communication services provided to DSL customers and end-users via the remote DSL terminals 105A-G. Changes to operational parameters to effect the DSM cooperative optimization techniques may be communicated to the global rule-set module 160 which defines operational constraints for the various DSL communication services and may further be enforced by the authorization module 230 for any particular physical port, logical port, twisted pair line, or combination of logical ports, physical ports, or twisted pair lines.

In one embodiment, the Device Abstraction Proxy 140 and the DSM module 250 both operate under the administrative control of the DSL services wholesaler 130. In such an embodiment, DSM optimizations may be applied across DSL communication services provided to DSL customers/end-users belonging to separate and distinct DSL services resellers 205A-B. In an alternative embodiment, the DSM module 250 applies cooperative DSM optimization techniques against two or more logical ports within the same virtual access aggregation device 210A-B. In such an embodiment, the Device Abstraction Proxy 140 may operate under the administrative control of a DSL services wholesaler 130 while administrative control of the virtual access aggregation device (e.g., 210A or 210B) and the DSM module 250 is delegated to a DSL services reseller 205A or 205B, enabling a DSL services reseller 205A or 205B to specify the services to be delivered to its customers subject to the infrastructure operations rules and/or operational constraints specified by DSL service wholesaler 130. Although administrative control of the DSM module 250 may be delegated to a DSL services reseller 205A or 205B, such administrative control may be restricted by authorization module 230 so that any particular DSL services reseller 205A or 205B may only affect DSM optimization techniques for those logical ports 121 that are allocated to a virtual access aggregation device 210A or 120B for which the DSL services reseller 205A or 205B also has complimentary administrative control.

In an alternative embodiment, at least one of the DSL services resellers 205A or 205B further include a Dynamic Spectrum Management (DSM) module, such as DSM module 275 depicted within DSL services reseller 205A. Other DSL services resellers may also have similar DSM modules, each of which may be communicatively interfaced with the Device Abstraction Proxy 140. In accordance with on embodiment, a Dynamic Spectrum Management (DSM) module 275 operates within a DSL services reseller 205A communicatively interfaced with the Device Abstraction Proxy 140 and the DSM module 275 performs one of the following cooperative DSM optimization techniques: 1) the DSM module 275 to apply DSM optimizations against at least one logical port (e.g., 121F) of the first virtual access aggregation device 210A associated with the DSL services reseller 205A and against at least one logical port (e.g., 121C) of a second virtual access aggregation device 210B associated with a second DSL services reseller 205B, wherein the DSM module 275 operates under the administrative control of a DSL services wholesaler 130; 2) the DSM module to apply the DSM optimizations against at least two or more logical ports (e.g., 121F and 121G) each associated exclusively with the first virtual access aggregation (210A), wherein the DSM module 275 operates under the administrative control of the DSL services wholesaler 130; and 3) the DSM module 275 to apply the DSM optimizations against the at least two or more logical ports (e.g., 121F and 121G) each associated exclusively with the first virtual access aggregation device 210A, wherein the DSM module 275 operates under the administrative control of the DSL services reseller 205A having administrative authority for the first virtual access aggregation device 210A.

Regardless of whether a DSL services reseller or a DSL services wholesaler has administrative authority over a DSM module (250 or 275), and regardless of whether a DSM module operates within a DSL services reseller (e.g., DSM module 275 of DSL services reseller 205A) or within a Device Abstraction Proxy (e.g., DSM module 250 of Device Abstraction Proxy 140), the DSM optimization techniques may be applied to those lines corresponding to the customers of multiple DSL services resellers, or in alternative embodiments, DSM optimization techniques may be applied via a DSM module (250 or 275) against those lines corresponding to the customers of only one DSL services reseller, so that any optimizations or changes to DSL communication services provided by the DSL services reseller affect only those customers of the one DSL services reseller. In some embodiments, multiple DSM modules (250 or 275) operate to provide DSM optimization capabilities, and each DSM module (250 or 275) operates on a per DSL services reseller basis, so that each DSM module (250 or 275) provides DSM optimizations for at most, one DSL services reseller.

Figure 3:
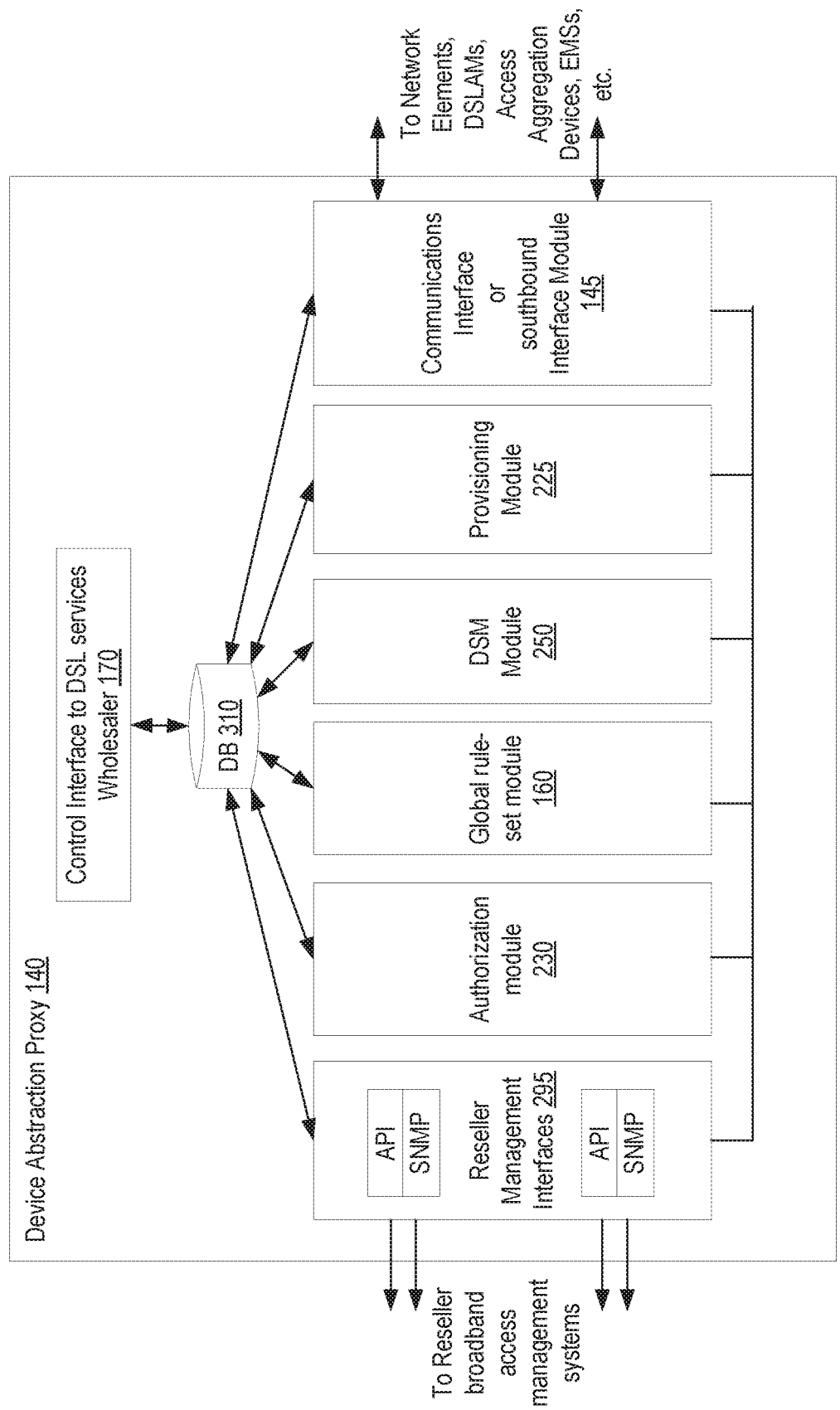
FIG. 3 illustrates an alternative exemplary architecture in which embodiments may operate.

FIG. 3 illustrates an alternative exemplary architecture 300 in which embodiments may operate. In particular, an alternative view of the various interfaces and functional modules of the Device Abstraction Proxy 140 is depicted in accordance with certain embodiments.

In accordance with one embodiment, the management interface 295 implements an Application Programming Interface (API) in which the management interface 295 presents each virtual access aggregation device (e.g., 210A and 210B) as an individual physical DSLAM device to DSLAM configuration tools via the API. The DSLAM configuration tools operated by a DSL services reseller 205A-B may thus be utilized to access and interface with the virtual access aggregation devices (e.g., 210A and 210B) as though they were physical DSLAMs. In such a way, DSL services reseller 205A-B may continue to use existing interface tools and software to communicate with the Device Abstraction Proxy 140 without having to develop or acquire new or different interfacing tools.

In one embodiment, the API implemented by the management interface 295 provides access to diagnostic information on behalf of the DSL services resellers on a per virtual access aggregation device basis via the management interface 295. For example, although physical ports associated with a particular DSL services reseller 205 may be spread across multiple separate and distinct access aggregation devices or DSLAMs, diagnostic information may nevertheless be presented for one virtual access aggregation device 210 as though all of the logical ports 121 of the virtual access aggregation device 210 were physical ports 120 within one physical DSLAM. As noted above, multiple virtual access aggregation devices 210 per DSL services reseller is also provided for, and thus, in accordance with one embodiment, the management interface 295 provides access to diagnostic information on behalf of the DSL services resellers 205 on a per DSL services reseller basis, in which all virtual access aggregation devices associated with a particular DSL services reseller are provided to the appropriate DSL services reseller via the management interface 295.

In one embodiment, diagnostic information is provided via the API of the management interface 295 to a diagnostic system of a DSL services reseller 205, to a DSL services wholesaler 130, or to a vendor that provides one or more of the DSLAM devices (e.g., access aggregation devices 125).

In one embodiment, management interface 295 communicates provisioning requests 240 from DSL services resellers 205 to a provisioning module 225 of the Device Abstraction Proxy 140. Such provisioning requests 240 may request that a physical port 120 on one of the remotely located access aggregation 125 devices to be allocated to a virtual access aggregation device 210 associated with a requesting DSL services reseller 205.

In one embodiment, management interface 295 provides access to operational data and port status information subject to restrictions enforced by an authorization module 230 of the Device Abstraction Proxy 140 which operates under the administrative control of a DSL services wholesaler 130.

In one embodiment, management interface 295 implements a remote application programming interface (R-API or RAPI), implements standard Simple Network Management Protocol (SNMP) interface using a similar SNMP schema as for physical access aggregation devices, and further implements secure communication capabilities (e.g., provided via, for example, Secure Sockets Layer (SSL)). DSL services resellers are accustomed to managing access aggregation devices using SNMP interfaces; the availability of an SNMP interface for managing virtual access aggregation devices enables DSL services resellers to use the same management tools for managing virtual access aggregation devices as for managing physical access aggregation devices In one embodiment, control interface 170 performs one or more of the following DSL services wholesaler operations including: providing a management data interface to a wholesaler's management system, including but not limited to at least one of the following: interfacing to a Provisioning System, Network Elements (NEs), interfacing to an Operations Support System (OSS), interfacing to an Element Management System (EMS), interfacing to a Network Management System (NMS); implementing aggregate traffic management operations against multiple virtual access aggregation devices 210 operating within the Device Abstraction Proxy 140; implementing traffic management operations on a per DSLAM basis or on a per access aggregation device 125 basis in which the traffic management operations are effected against any one of the plurality of remotely located physical access aggregation devices 125; implementing vendor support operations that are applied against any of the remotely located physical access aggregation devices (e.g., vendor support operations may be applied against one or more DSLAMs manufactured or supported by a particular DSLAM vendor); implementing profile provisioning and selection operations on behalf of a DSL services wholesaler 130 responsive to logical port configuration requests received from a DSL services reseller 205 via the management interface 295; and implementing wholesaler notification operations responsive to profile changes affecting one or more logical ports 121 within any virtual access aggregation device 210 executing within the Device Abstraction proxy 140; and backing up and/or restoring configuration information for physical DSLAMs communicatively interfaced via control interface 170. The preceding list is exemplary of the various operations permissible and should not be considered exhaustive.

Additionally depicted by FIG. 3 is Database 310. In one embodiment, database 310 provides data support and storage for the Device Abstraction Proxy 140. For example, database 310 may provide physical port to reseller mapping or physical port to virtual access aggregation device mapping, store rule definitions on behalf of the global rule-set module 160, store loop inventory information describing the available loops communicatively interfaced to the Device Abstraction Proxy 140 through the plurality of remotely located access aggregation devices 125, etc.

In some embodiments, DSL services resellers may have a local replica of database 310 having the corresponding Device Abstraction Proxy 140 information stored therein. In such an embodiment, the local replica may be limited or restricted to include only information associated with physical ports or logical ports to which a DSL services reseller has administrative control via a virtual access aggregation device 210.

In one embodiment, the communications interface 145 may include a "southbound" interface, providing connectivity to the various network elements, DSLAMs, EMSs, access aggregation devices, and other such equipment that makes up the DSL services wholesaler's communications infrastructure. Control interface 170 may sometimes be referred to as an operator facing "northbound" interface connecting an operator/DSL services wholesaler 130 to the Device Abstraction Proxy 140 over which such an operator/wholesaler may issue provisioning instructions, alter a configuration of the Device Abstraction Proxy 140, alter the rules and operational constraints defined by a global rule-set module 160, and so forth. Management interface 295 may sometimes be referred to as a reseller facing "northbound" interface connecting the reseller service providers 205 to the Device Abstraction Proxy.

The commands, requests, instructions, and data communicated over communications Interface 145, control interface 170, and management interface 295 as described herein may be received, acknowledged and/or transmitted using any of a variety of format(s), communication protocol(s) and/or technique(s), including but not limited to, Internet, TCP/IP, UDP, RTP, Secure Socket Layer (SSL)/Transport Layer Security (TLS), Hyper-Text Transport Protocol (HTTP), Simple Object Access Protocol (SOAP), Remote Procedure Call (RPC) methods, TR-069 (Broadband Forum Technical Report TR-069, and its variants), etc. It is appreciated that other communication methods, such as the public switched telephone network (PSTN), cellular data communications, electronic mail communications, USB, and flash memory, could also be used for the communications.

Figure 4:
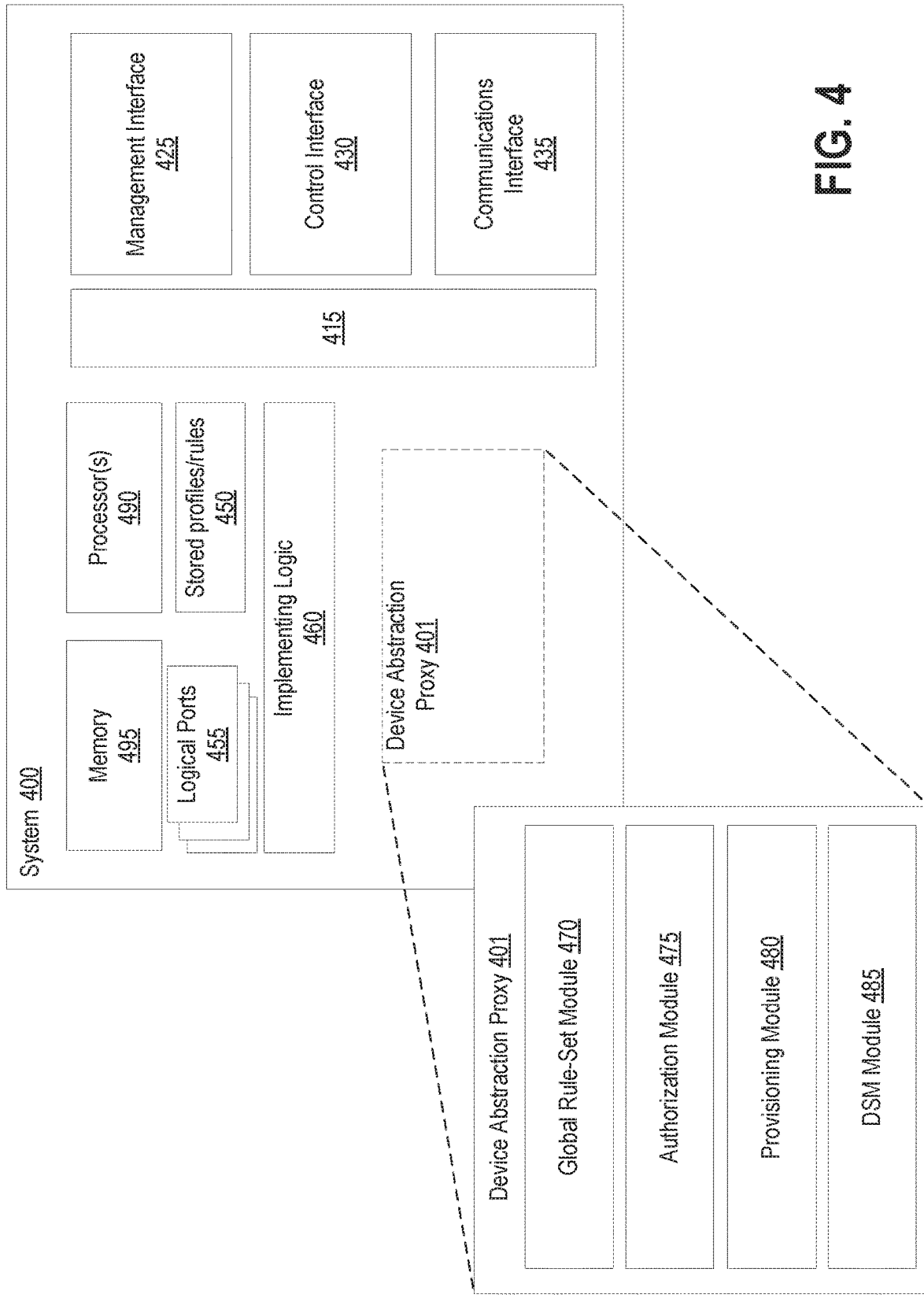
FIG. 4 shows a diagrammatic representation of a system in which embodiments may operate, be installed, integrated, or configured.

FIG. 4 shows a diagrammatic representation of a system 400 in which embodiments may operate, be installed, integrated, or configured.

In one embodiment, system 400 includes a memory 495 and a processor or processors 490. For example, memory 495 may store instructions to be executed and processor(s) 490 may execute such instructions. Processor(s) 490 may also implement or execute implementing logic 460 having logic to implement the methodologies discussed herein. System 400 includes communication bus(es) 415 to transfer transactions, instructions, requests, and data within system 400 among a plurality of peripheral devices communicably interfaced with one or more communication buses 415. In one embodiment, system 400 includes a communication means 415 to interface, transfer, transact, relay, and/or communicate information, transactions, instructions, requests, and data within system 400, and among plurality of peripheral devices. System 400 further includes management interface 425, for example, to receive requests, return responses, and otherwise interface with remote clients, such as broadband access management systems 215A or 215B associated with DSL services resellers 205. System 400 further includes control interface 430 to communicate with and receive control messages and/or instructions 235 from a DSL services wholesaler 130 responsive to which operational configurations or changes may be effected upon system 400. System 400 further includes communications interface 435 which provides connectivity between system 400 and the various network elements, DSLAMs, access aggregation devices, and other DSL communication infrastructure equipment operated by a DSL services wholesaler 130.

System 400 further includes multiple stored profiles and rules 450 that may be implemented or applied to various logical ports 455 of system 400 to provide DSL communication services to remotely located DSL terminals via remote access aggregation devices communicatively interfaced with system 400. The stored profiles and rules 450 may be stored upon a hard drive, persistent data store, a database, or other storage location within system 400.

Distinct within system 400 is Device Abstraction Proxy 401 which includes global rule-set module 470, authorization module 475, provisioning module 480, and DSM module 485. Device Abstraction Proxy 401 may be installed and configured in a compatible system 400 as is depicted by FIG. 4, or provided separately so as to operate in conjunction with appropriate implementing logic 460 or other software.

In accordance with one embodiment, global rule-set module 470 defines rules or operational constraints as established by a DSL services wholesaler to be applied to one or more logical ports 455 of system 400. Authorization module 475 coordinates with global rule-set module 470 to ensure that defined operational constraints are enforced. Provisioning module 480 effects configuration changes responsive to requests from DSL services wholesalers or from DSL services resellers subject to defined operational constraints. DSM module 485 implements cooperative DSM optimization techniques under the administrative authority of either DSL services wholesalers, DSL services resellers, or both.

Figure 5C:
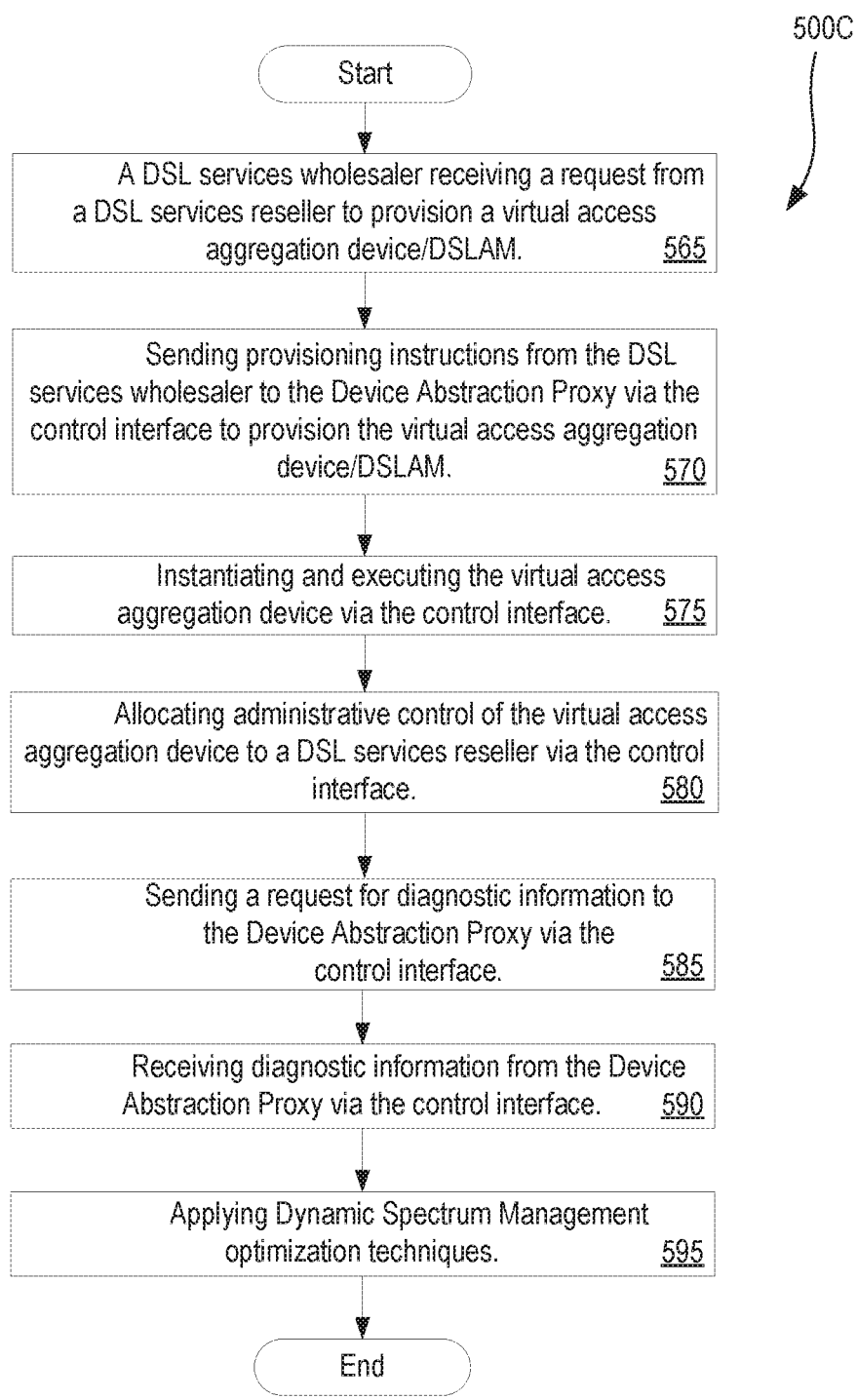

FIGS. 5A, 5B, and 5C are flow diagrams illustrating methods for implementing and operating Device Abstraction Proxies accordance with described embodiments. Methods 500A, 500B, and/or 500C may be performed by processing logic that may include hardware (e.g., circuitry, dedicated logic, programmable logic, microcode, etc.), software (e.g., instructions run on a processing device to perform various operations such as provisioning, allocating, configuring, and accessing a virtual access aggregation device/DSLAM, etc., or some a combination thereof. In one embodiment, methods 500A, 500B, and 500C are performed by a Device Abstraction Proxy such as that depicted at element 140 of FIG. 1, and FIG. 2 or via a Device Abstraction Proxy such as that depicted at element 401 of FIG. 4. Some of the blocks and/or operations listed below are optional in accordance with certain embodiments. The numbering of the blocks presented is for the sake of clarity and is not intended to prescribe an order of operations in which the various blocks must occur.

Method 500A begins with processing logic for communicably interfacing a Device Abstraction Proxy with one or more access aggregation devices, each having a plurality of physical ports thereon (block 505). In some embodiments, one or more of the connected access aggregation devices are remotely located from a Device Abstraction Proxy and in other embodiments, one or more of the access aggregation devices are co-located with a Device Abstraction Proxy, such as, within the same data center. In one embodiment, only one access aggregation device is communicably interfaced with a Device Abstraction Proxy. For example, in such an embodiment, a Device Abstraction Proxy and a physical access aggregation device, such as a DSLAM, may operate within the same physical computing device, thus enabling the DSLAM/access aggregation device to provide virtualized abstraction of its own physical ports, so that aspects of administrative authority for the DSLAM/access aggregation device may be delegated to, for example, a DSL services reseller. In other embodiments, multiple access aggregation devices are communicably interfaced with a single Device Abstraction Proxy and one or more physical ports of each access aggregation device are represented via virtual abstraction devices of the Device Abstraction Proxy.

At block 510, processing logic allocates a subset of the plurality of physical ports to the virtual access aggregation device executing within the Device Abstraction Proxy. In some embodiments the subset of physical ports allocated to the virtual access aggregation device includes one or more physical ports on a first remotely located access aggregation device and one or more physical ports on a second remotely located access aggregation device, so that the subset of physical ports includes physical ports distributed amongst multiple access aggregation devices. At block 515, processing logic links the allocated subset of physical ports to corresponding logical ports within the virtual access aggregation device.

At block 520, processing logic provides a management interface to allow at least one broadband access management system of the DSL services reseller to manage the subset of physical ports allocated to the virtual access aggregation device.

Method 500B begins with processing logic at a DSL services reseller for accessing a Device Abstraction Proxy via a management interface API (block 530).

At block 535, processing logic sends a request via the management interface API from the DSL services reseller to the Device Abstraction Proxy to manage a logical port within a virtual access aggregation device of the Device Abstraction Proxy. The Device Abstraction Proxy correspondingly receives the request. The selected management function/operation requested may include at least one of the following functions: modifying and updating configuration, resetting, updating settings, reading information, sending commands, sending and receiving diagnostics information and commands, changing profiles. These management functions may be applied to the logical ports within the virtual access aggregation device, through which they are in turn applied to correspondingly linked physical ports on the access aggregation devices associated with the DSL services reseller.

At block 540, processing logic at the DSL services reseller receives notification via the management interface from the Device Abstraction Proxy that the management selection specified by the request complies with operational constraints. For example, the Device Abstraction Proxy processes the request via an authorization module which determines that the management specified by the request complies with the plurality of operational constraints, such as those defined by a global rule-set module and enforced via an authorization module. If the requested management function/operation selected does not comply, it may be rejected completely, or altered so that it is brought in-line with an acceptable configuration in accordance with the plurality of operational constraints.

At block 545, processing logic manages the logical port in accordance with the request. Management of the logical port within the virtual access aggregation device is reflected by a corresponding physical port linked to the logical port, thus effecting the configuration onto the DSL communication services provided to a remote DSL terminal via the particular physical port linked to the logical port that was configured. For example, managing the logical port as may include receiving a request to reset a physical port on one of the plurality of access aggregation devices or DSLAMs and processing the request accordingly. For example, processing logic may reset a physical port requested to be reset when the physical port is determined to be allocated to a virtual access aggregation device for which a requestor has administrative control. In one embodiment, if the requestor lacks administrative control over a virtual access aggregation device to which the physical port is allocated, or if the physical port is in an unallocated state, the request to reset the physical port is rejected by the Device Abstraction Proxy. In one embodiment, a requestor may issue a "reset all ports" command or "reset DSLAM" command which would be implemented upon a virtual access aggregation device as a request to reset all the physical ports that are allocated to the particular virtual access aggregation device for which the requestor has administrative control. Similar determinations are made (e.g., whether to execute a requested command or reject the request) for port operations such as requests to enable a port, disable a port, solicit status of a port, request diagnostic information for a specified port, etc.

At block 550, processing logic sends a request for diagnostic information to the Device Abstraction Proxy via the management interface and at block 555, the DSL services reseller receives the requested diagnostic information from the Device Abstraction Proxy via the management interface. In such an embodiment, the diagnostic information received may be limited by an authorization module of the Device Abstraction Proxy to a restricted, filtered, or limited view of all available diagnostic information, for example, diagnostic information may be limited to only information pertaining to virtual access aggregation devices over which the requesting DSL services reseller has administrative authority.

At block 560, processing logic at a DSL services reseller applies Dynamic Spectrum Management optimization techniques. For example such techniques may be applied via a DSM module located within the DSL services reseller and operate under the administrative authority of the DSL services reseller or under the administrative authority of a DSL services wholesaler. Alternatively, the DSM optimization techniques may be applied via a DSM module located within the Device Abstraction Proxy and operate under the administrative authority of the DSL services reseller or under the administrative authority of a DSL services wholesaler.

Method 500C begins with processing logic at a DSL services wholesaler for receiving a request from a DSL services reseller to provision a virtual access aggregation device/DSLAM (block 565). Alternatively, a DSL services wholesaler may initiate provisioning absent a request from a DSL services reseller.

At block 570, processing logic sends provisioning instructions from the DSL services wholesaler to the Device Abstraction Proxy via the control interface to provision the virtual access aggregation device/DSLAM. The Device Abstraction Proxy correspondingly receives the provisioning instructions from the DSL services wholesaler to provision the virtual access aggregation device.

At block 575, processing logic instantiates and executes or instructs the Device Abstraction Proxy to instantiate and execute the virtual access aggregation device via the control interface. The Device Abstraction Proxy correspondingly instantiates and executes the virtual access aggregation device as instructed by the DSL services wholesaler.

At block 580, processing logic allocates administrative control of the virtual access aggregation device to a DSL services reseller via the control interface. In some embodiments, administrative control of a DSM module for performing cooperative DSM optimization techniques may also be allocated to the DSL services reseller. In other embodiments, administrative control of such a DSM module is retained within the exclusive control of a DSL services wholesaler having administrative authority for the Device Abstraction Proxy. In some embodiments, a DSM module is located at a DSL services reseller yet operates under the control of the DSL services wholesaler or in alternative embodiments, a DSM module at a DSL services reseller operates under the administrative authority of the DSL services reseller.

At block 585, processing logic sends a request for diagnostic information to the Device Abstraction Proxy via the control interface and at block 590, the DSL services wholesaler receives the requested diagnostic information from the Device Abstraction Proxy via the control interface.

At block 595, processing logic at the DSL services wholesaler specifies, configures, or initiates Dynamic Spectrum Management optimization techniques to be applied to DSL communication services. For example such techniques may be applied via a DSM module located within a DSL services reseller which operates under the administrative authority of the DSL services reseller or under the administrative authority of the DSL services wholesaler which the DSL services wholesaler may control via the Device Abstraction proxy. Alternatively, the DSM optimization techniques may be applied via a DSM module located within the Device Abstraction Proxy and operate under the administrative authority of the DSL services reseller or under the administrative authority of a DSL services wholesaler.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent data base implementations), which communicate with each other via a bus 630. Main memory 604 includes information and instructions and software program components necessary for performing and executing the functions with respect to the various embodiments of the Device Abstraction Proxy described herein. For example, stored rules and profiles 624 specify operational constraints as defined by a global rule-set module and enforced by an authorization module and stores profiles to be applied to physical/logical ports thus establishing DSL communication services). Main memory 604 further includes multiple logical ports 623 to which physical ports are linked once allocated to a virtual device abstraction proxy. Main memory 604 and its sub-elements (e.g. 623 and 624) are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.). The computer system 600 may perform the functions of a Device Abstraction Proxy 634 capable of provisioning virtual access aggregation devices, configuring such virtual access aggregation devices, and authorizing requested changes, access to, or configurations of virtual access aggregation devices including logical ports therein, and defining/enforcing operational constraints upon logical ports within the virtual access aggregation devices, as well as the various other functions and operations described herein.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. Software 622 may also reside, or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A network management apparatus comprising:
a plurality of physical access aggregation interfaces coupled to a plurality of physical access aggregation devices, the plurality of physical access aggregation devices provides one or more broadband communication services to a plurality of remote broadband terminals; and
a management entity coupled to the plurality of physical access aggregation interfaces, the management entity creates a plurality of virtual access aggregation devices related to the plurality physical access aggregation devices, the plurality of virtual access aggregation devices performs functions that support associated logical aggregation networks with network characteristics defined by service definition rules.

2. The apparatus of claim 1 wherein the service definition rules define operational characteristics of logical ports on the plurality of virtual access aggregation devices.

3. The apparatus of claim 1 wherein the management entity enforces traffic rules on the plurality of logical aggregation networks.

4. The apparatus of claim 1 wherein the management entity requests a management function to configure the plurality of virtual access aggregation devices.

5. The apparatus of claim 1 wherein the management system instantiates the one or more virtual access aggregation devices.

6. The apparatus of claim 1 wherein each of the plurality of logical aggregation networks provides specific network capabilities and network characteristics.

7. The apparatus of claim 1 further comprising a management interface that reports diagnostic information to one or more service providers.

8. The apparatus of claim 1 wherein the management entity provides control of a portion of functionality to at least one physical access aggregation device within the plurality of the physical access aggregation devices.

9. The apparatus of claim 1 wherein one or more logical aggregation network within the plurality of logical aggregation networks is a part of a network slice which traverses a wide area network.

10. The apparatus of claim 9 wherein one or more network slice provides specific network capabilities and network characteristics.

11. The apparatus of claim 1 wherein the management entity is distributed across one or more physical network elements.

12. The apparatus of claim 1 wherein the plurality of physical access aggregation devices supports at least one of the following: DSL, G.fast, PON, GPON, XG-PON, XGS-PON, NG-PON2, EPON, 10G-EPON, WDM-PON; Powerline Communications, Mobile Wireless Communications, Fixed Wireless Communications, Cellular Wireless Communications, Wi-Fi, or Cable Modem.

13. A method comprising:
providing one or more broadband communication services to a plurality of remote broadband terminals via at least one of a plurality of physical ports that are located on one or more physical access aggregation devices;
communicatively interfacing a management entity to the one or more physical access aggregation devices;
creating a plurality of virtual access aggregation devices related to the one or more physical access aggregation devices; and
performing functions by each of the plurality of virtual access aggregation devices that support the one or more logical aggregation networks having certain network characteristics that comply with service definition rules, each of the one or more logical aggregation networks being part of a network slice that traverses a wide area network.

14. The method of claim 13 wherein the management entity enforces traffic rules on the one or more logical aggregation networks.

15. A non-transitory computer readable storage media having computer program code stored thereon, the computer program code, when executed by one or more processors implementing a management system, cause the management system to perform an operation which comprises:
providing one or more broadband communication services to a plurality of remote broadband terminals via at least one of a plurality of physical ports that are located on one or more physical access aggregation devices;
communicatively interfacing a management entity to the one or more physical access aggregation devices;
creating a plurality of virtual access aggregation devices related to the one or more physical access aggregation devices; and
performing functions by each of the plurality of virtual access aggregation devices that support the one or more logical aggregation networks having certain network characteristics that comply with service definition rules, each of the one or more logical aggregation networks being part of a network slice that traverses a wide area network.

16. The non-transitory computer readable storage media of claim 15 wherein the management entity instantiates the one or more virtual access aggregation devices.

17. The non-transitory computer readable storage media of claim 15 wherein each of the one or more logical aggregation networks provides specific network capabilities and network characteristics.

* * * * *